United States Patent
Beaudet et al.

(10) Patent No.: US 10,529,047 B2
(45) Date of Patent: Jan. 7, 2020

(54) DETECTION OF FRAUD FOR ACCESS CONTROL VIA FACIAL RECOGNITION

(71) Applicant: IDEMIA IDENTITY & SECURITY FRANCE, Issy les Moulineaux (FR)

(72) Inventors: Jean Beaudet, Issy les Moulineaux (FR); Francois Rieul, Issy les Moulineaux (FR); Joel-Yann Fourre, Issy les Moulineaux (FR); Pierre Chastel, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 16/057,657

(22) Filed: Aug. 7, 2018

(65) Prior Publication Data
US 2019/0050955 A1    Feb. 14, 2019

(30) Foreign Application Priority Data
Aug. 8, 2017    (FR) ...................................... 17 57585

(51) Int. Cl.
*G06F 21/32*    (2013.01)
*G01G 19/414*    (2006.01)
(Continued)

(52) U.S. Cl.
CPC ......... *G06Q 50/265* (2013.01); *G01G 19/414* (2013.01); *G01G 19/44* (2013.01);
(Continued)

(58) Field of Classification Search
CPC .................................................. B60Q 50/265
See application file for complete search history.

(56) References Cited

U.S. PATENT DOCUMENTS

| 2004/0052403 A1* | 3/2004 | Houvener | .......... | G07C 9/00087 |
| | | | | 382/115 |
| 2006/0059557 A1* | 3/2006 | Markham | .......... | G07C 9/00158 |
| | | | | 726/22 |

(Continued)

FOREIGN PATENT DOCUMENTS

| CN | 101246608 A | 8/2008 |
| FR | 2871602 A1 | 12/2005 |
| JP | 2017-041218 A | 2/2017 |

OTHER PUBLICATIONS

Wen et al., "A computational approach to body mass index prediction from face images", Image and Vision Computing, vol. 31, No. 5, 2013, pp. 392-400.

(Continued)

*Primary Examiner* — Joseph H Feild
*Assistant Examiner* — Pameshanand Mahase
(74) *Attorney, Agent, or Firm* — Womble Bond Dickinson (US) LLP

(57) ABSTRACT

A fraud detection method for access control via facial recognition, wherein the following are carried out in the region of a zone where the access control is verified for an individual presenting in the region of the zone: a measure of the weight of the individual, at least one weight sensor being provided on the ground for this purpose; an estimation of the weight of the individual by processing by a computer unit of an image acquired of the face of an individual presenting at the access control; a comparison by the computer unit between the estimated weight and the measured weight and wherein the computer unit triggers or not the sending of a fraud detection signal as a function of the result of this comparison.

11 Claims, 2 Drawing Sheets

(51) Int. Cl.
     *G01G 19/44*    (2006.01)
     *G01G 19/50*    (2006.01)
     *G06Q 50/26*    (2012.01)
     *G06K 9/00*     (2006.01)
     *G07C 9/00*     (2006.01)
     *H04L 29/06*    (2006.01)

(52) U.S. Cl.
     CPC ......... *G01G 19/50* (2013.01); *G06K 9/00281* (2013.01); *G06K 9/00288* (2013.01); *G06K 9/00295* (2013.01); *G06K 9/00369* (2013.01); *G06K 9/00892* (2013.01); *G07C 9/00158* (2013.01); *H04L 63/0861* (2013.01)

(56) References Cited

U.S. PATENT DOCUMENTS

| | | | |
|---|---|---|---|
| 2006/0093183 A1* | 5/2006 | Hosoi | G06K 9/00255 382/103 |
| 2016/0063314 A1* | 3/2016 | Samet | G06K 9/00288 348/78 |
| 2016/0091359 A1 | 3/2016 | Alam et al. | |
| 2016/0109281 A1* | 4/2016 | Herring | G01G 19/4144 177/1 |

OTHER PUBLICATIONS

Preliminary Research Report received for French Application No. 1757585, dated May 23, 2018, 3 pages (1 page of French Translation Cover Sheet and 2 pages of original document).

* cited by examiner

DETECTION OF FRAUD FOR ACCESS CONTROL VIA FACIAL RECOGNITION

GENERAL TECHNICAL FIELD AND PRIOR ART

The present invention relates to the access control by facial recognition.

More particularly, the invention proposes a method and a fraud detection system for the access control systems of this type.

Facial recognition is known conventionally and is currently used by access control systems, especially for border control (airports or similar).

It consists of acquiring at least one image of an individual presenting at the control system (control sluice or corridor fitted with one or more cameras, for example), analysing him to deduce therefrom a certain number of facial characteristics (for example, eye spacing, nose ridges, corners of lips, ears, chin, etc.) and comparing these characteristics to sets of characteristics stored in an existing database to identify a person or verify his identity.

One of the possible frauds with this type of system for an individual consists of trying to pass right in behind another person by sneaking so as to be hidden relative to the cameras.

Several techniques have already been put forward for detecting this type of fraud.

A first solution consists of detecting the existence of several faces on the images.

Another possible technique consists of using a camera in time of flight which is positioned vertically relative to the zone where people present and travel.

Yet another solution consists of using a uniform carpet, that is, a carpet enabling acquisition of pressure measurements linked to the gait of a person on the latter and to applying to these processing measurements intended to detect the fact that two people are moving forward on the carpet.

An example in this sense is for example described in French patent application FR2871602.

This solution however proves inadequate for authentically preventing any fraud.

All these solutions are complementary and none is sufficient alone.

Application CN101246608 has already proposed comparing a weight which is measured to a previously recorded to detect any fraud during motion past a control device.

Such a system is not possible in practical terms to the extent where it is likely to generate false detections especially when a person has been able to change weight between the time when he recorded his personal information and the time when the control is performed.

Therefore there is still a need for novel solutions for fraud detection, which are simple, inexpensive, reliable and potentially complementary to existing solutions.

General Presentation of the Invention

A general aim of the invention is to propose a fraud detection solution for access control system by facial recognition which is efficacious, simple to execute and inexpensive.

For this purpose, the invention proposes a fraud detection method for access control by facial recognition, wherein the following are carried out in the region of a zone where the access control is verified for an individual presenting in the region of said zone:

a measure of the weight of the individual, at least one weight sensor being provided on the ground for this purpose;

an estimation of the weight of the individual by processing by a computer unit of an image acquired of the face of an individual presenting at the access control;

a comparison by said computer unit between the estimated weight and the measured weight;

and wherein said computer unit triggers or not the sending of a fraud detection signal as a function of the result of this comparison.

In this way, the proposed method makes a comparison, not with previously stored information, but with estimation of the weight in real time.

Because of this it is more effective than the techniques of the prior art.

This method is advantageously completed by the following different characteristics taken singly or in combination:

the estimation of the weight of the individual executes an estimation of the body mass index of the person by processing of an image of the face by the computer unit;

the estimation of the weight of the individual executes an estimation of the height of the latter by processing of at least one image of the face by the computer unit;

the estimation of the height of the individual executes a determination of the height of the eyes of the latter;

during comparison by the computer unit between the estimated weight and the measured weight, said computer unit verifies whether the measured weight is higher than the estimated weight, at a given margin of error, and triggers a fraud detection signal when this is the case;

the given margin of error is of the order of 20 kg;

the given margin of error is between 7 and 15 kg.

The invention also proposes a method for access control wherein:

at least one image is acquired of the face of an individual presenting in a zone where the access control is verified, biometric characteristics of the face are determined on this image, these biometric characteristics of the face of the individual are compared to biometric characteristics stored in a reference document or in a database, access is authorized or not as a function of the result of this comparison, characterized in that fraud detection of the type explained above is also carried out.

The invention also proposes a fraud detection system and an access control system.

PRESENTATION OF THE FIGURES

Other characteristics and advantages of the invention will emerge from the following description which is purely illustrative and non-limiting and must be considered with respect to the appended drawings, in which.

DESCRIPTION OF ONE OR MORE EMBODIMENTS

Figure 1:
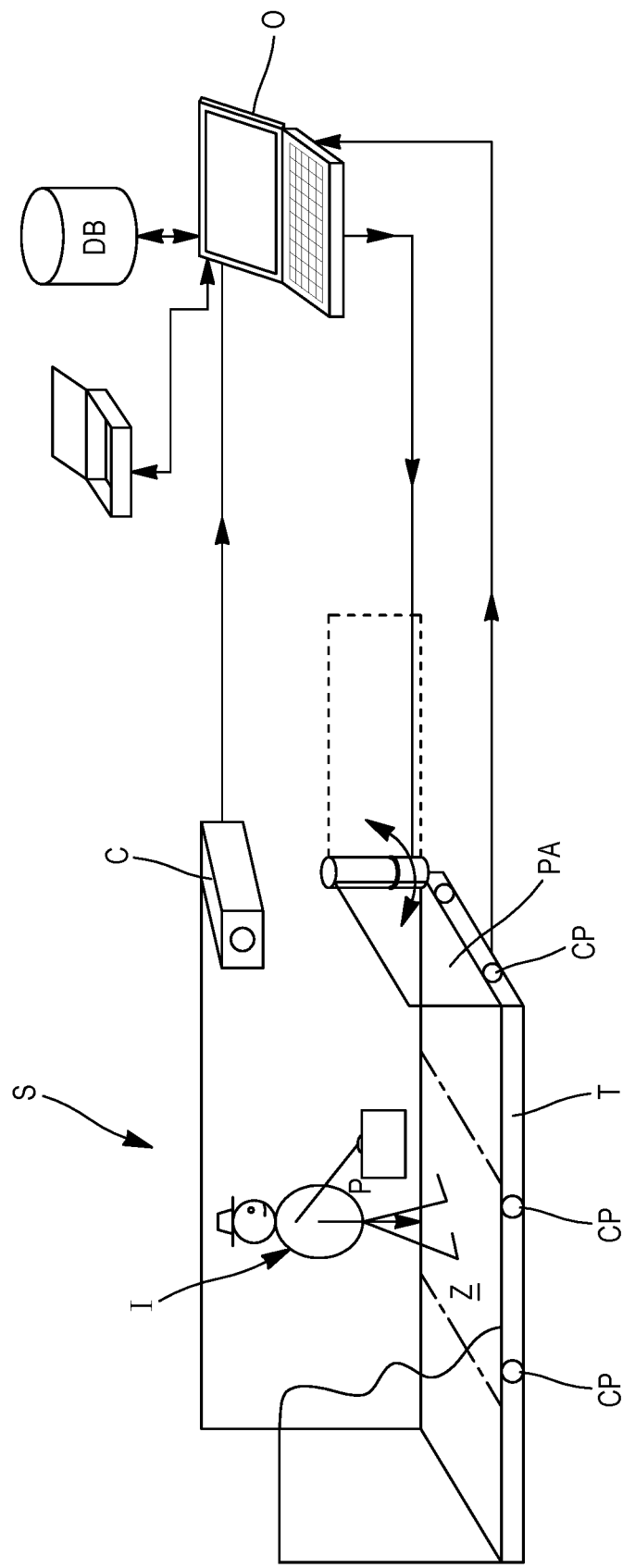
FIG. 1 is a schematic representation of an access control system according to a possible embodiment of the invention.

FIG. 1 illustrates an access control system S by facial recognition.

This system comprises one or more cameras C arranged in a sluice for access control at a height and with orientation allowing acquisition of an image of the face of an individual I moving in a corridor leading to an access gate PA.

The camera or cameras C are connected to a processing unit U (computer, computer server, etc.) to which the images are sent.

This processing unit U is capable of processing the image or the images received to deduce facial biometry characteristics therefrom.

It is also capable of exchanging with a document reader L holding biometric information (biometric passport chip reader for example) or even with a database DB in which the biometric characteristics are stored of the individuals who are to be given access to a reserved zone beyond the gate PA (or again individuals to be detected when presenting at the gate PA for example).

The unit constituted by the computer U controls opening or blocking of the gate PA as a function of the results of comparisons made on the characteristics of the images.

This opening is also a function of the result of comparison between an estimated weight for the individual I moving in the corridor of the sluice and his measured weight as he passes along in the sluice.

For this purpose, the corridor can have a carpet for measuring weight, which measures the weight of the individual moving on the latter.

In particular, a specific zone Z can be provided in the access corridor in the region of which the individual I is asked to stop to allow the measuring of weight and the acquisition of images of his face.

This zone Z is for example embodied on the ground by single lines or is preferably a closed zone of sluice type.

The carpet on which the individual I moves is equipped with weight sensors CP, especially in the region of this stopping zone Z.

The weight measurements obtained in this way are sent to the processing unit U to perform a comparison between the weight measured in this way and the estimated weight determined from the characteristics of the image of the face of the individual I.

Figure 2:
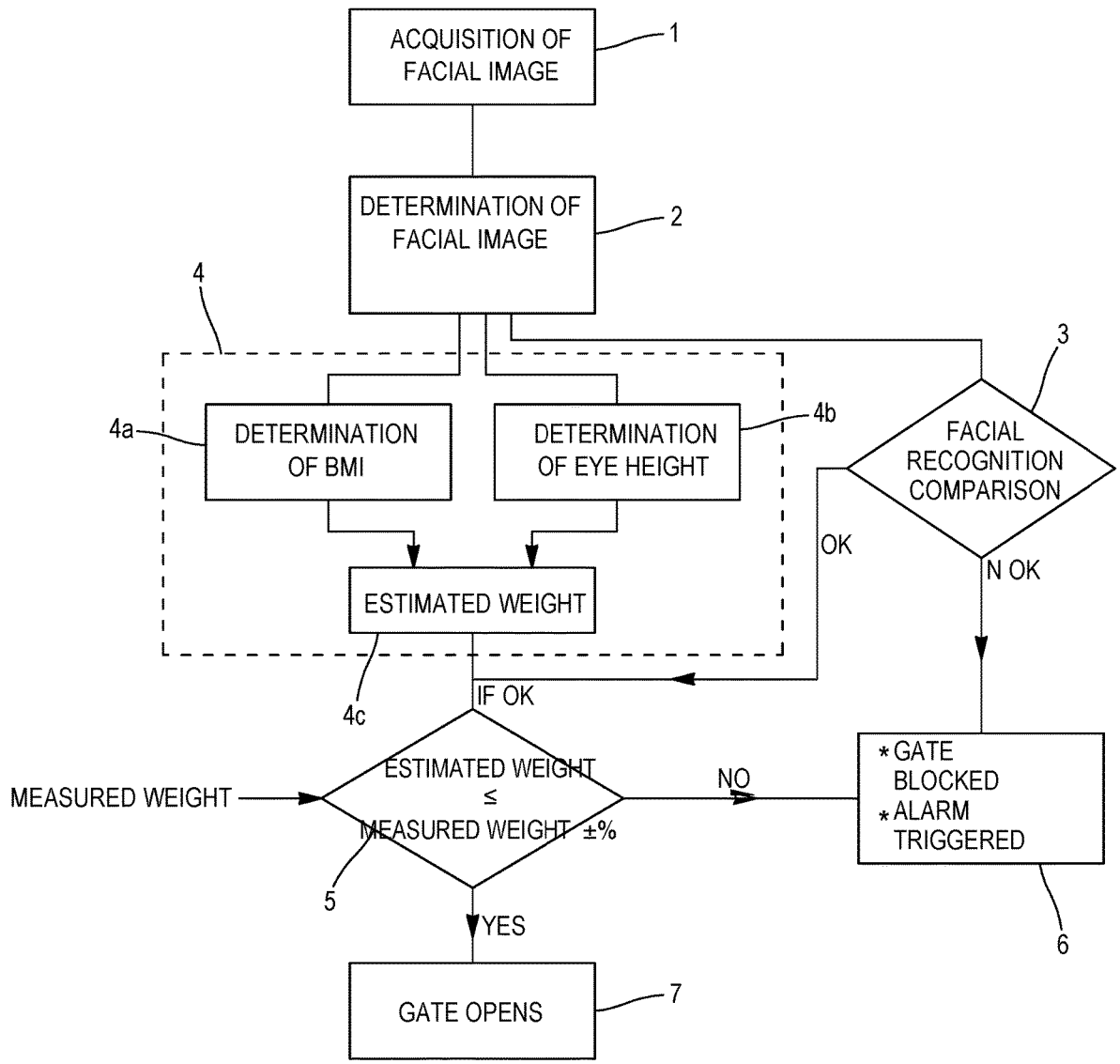
FIG. 2 illustrates different steps of processing of access control and fraud detection according to a possible embodiment of the invention.

More particularly, the processing of a facial image and the access control can be done as illustrated in FIG. 2.

After acquisition of the image (step 1), the processing unit determines the biometric characteristics of the face (spacing of eyes, nose ridges, corners of lips, ears, chin, etc.) (step 2).

These biometric characteristics of the individual are then used both to perform facial recognition (step 3) and also to determine the estimated weight (step 4).

Facial recognition 3 is performed by interrogating the database DB or by comparing the characteristics of the image acquired to characteristics supplied by an official document such as a biometric passport with chip.

According to the result of the comparison, the unit U can be led to trigger an alarm by keeping the access gate PA blocked (step 6—case of result NOK) or by contrast considering that one of the conditions for the opening of the gate is satisfied (case OK).

Estimation of the weight (step 4) is done by processing the biometric characteristics of the image to estimate the body mass index of the person (step 4a), and by determining the height of the eyes of the individual (step 4b).

Estimation of the BMI is done for example as proposed in the article Wen, L., & Guo, G. (2013), *A Computational Approach To Body Mass Index Prediction From Face Images*, Image and Vision Computing, 31(5), 392-400.

Processing events based on artificial intelligence algorithms (machine learning) are also possible.

In parallel with this step 4a, the processing carries out determination of the height of the eyes of the individual I (step 4b). This determination is a function of the orientation of the camera and is done for example by determining the position of the eyes on the image acquired when the individual marks stopping time in the region of the zone Z.

It can also be done by analysis of several successive images acquired while the individual I moves in the corridor which leads to the access gate PA.

The height of the eyes determined in this way allows an approximation of the height of the person.

The double estimation of the body mass index on the one hand and of the height of the eyes of the individual on the other allows estimation of the mass of the person (step 4c):

$$\text{estimated weight} = \text{BMI} \times (\text{height of the individual})^2$$

The "estimated P" weight is then compared to the weight "measured P" (step 5) with a given margin of error.

When the measured weight is clearly higher than the estimated weight, the access gate PA is blocked and an alarm is triggered (step 6).

By contrast, when the estimated weight and the measured weight correspond substantially, the opening of the gate is controlled (step 7).

The order of magnitude of the error between the estimated weight and the measured weight is for example ten kilos (for example of the order of 20 kg, or between 7 and 15 kg). This order of magnitude considers the margin of error on estimation of the weight as well as any carry-on luggage the individual can have with him when he passes through control.

In this way, the proposed processing enables fraud detection by detecting not the fraudster himself but any incoherence between the person facing the camera and the measured weight.

The invention claimed is:

1. A fraud detection method for access control by facial recognition, comprising:
   measuring a weight of an individual using at least one weight sensor provided on the ground in a region where the access control is verified;
   estimating a weight of the individual by processing by a computer unit an image acquired of a face of the individual, the image acquired of the individual while the individual is within the region where the access control is verified;
   comparing by said computer unit the estimated weight and the measured weight; and
   as a result of the comparison, said computer unit triggering or not using a fraud detection signal.

2. The method according to claim 1, wherein estimating the weight of the individual comprises estimating a body mass index of the individual by processing the image of the face by the computer unit.

3. The method according to claim 2, wherein estimating the weight of the individual comprises estimating a height of the individual by processing of the image acquired of the face by the computer unit.

4. The method according to claim 3, wherein estimating the height of the individual comprises estimating a height of the eyes of the individual.

5. The method according to claim 1, further comprising, while comparing the estimated weight and the measured weight, verifying by said computer unit whether the measured weight is higher than the estimated and within a given margin of error, and, if the measured weight is higher than the estimated weight, triggering the fraud detection signal.

6. The method according to claim 5, wherein the given margin of error is of the order of 20 kg.

7. The method according to claim 5, wherein the given margin of error is between 7 and 15 kg.

8. The method according to claim 1, further comprising:
determining biometric characteristics of the face of the individual from the image,
comparing the biometric characteristics of the face of the individual to biometric characteristics stored in a reference document or in a database,
authorizing or not authorizing access to the zone as a function of the result of this comparison.

9. A fraud detection system for access control by facial recognition, comprising:
at least one weight sensor on the ground for measuring a weight of an individual presenting in a zone where the access control is verified;
a computer unit adapted for estimating of the weight of an individual on an image acquired of a face of the individual presenting in the zone where access control is verified;
said computer unit further adapted for comparing the estimated weight and the measured weight and for triggering or not a fraud detection signal as a function of this comparison.

10. The fraud detection system according to claim 9, further comprising at least one camera for acquiring the image of the face of the individual, and
wherein said computer unit is further adapted for determining, from the image, biometric characteristics of the face of the individual, said computer unit is further adapted for comparing the determined biometric characteristics of the face of the individual with biometric characteristics stored in a reference document or in a database and for authorizing or not access to the zone as a function of the result of the comparison.

11. The fraud detection method according to claim 1, wherein estimating the weight of the individual by processing the image acquired of the face of the individual comprises determining biometric characteristics of the face of the individual, the biometric characteristics include spacing of one or more of eyes, nose ridges, lip corners, ears, and chin.

\* \* \* \* \*